US011863928B2

(12) United States Patent
Johansen

(10) Patent No.: US 11,863,928 B2
(45) Date of Patent: Jan. 2, 2024

(54) RETAINING MEMBER FOR EARPIECE OF HEARING DEVICE

(71) Applicant: GN Hearing A/S, Ballerup (DK)

(72) Inventor: Jan Johansen, Ballerup (DK)

(73) Assignee: GN HEARING A/S, Ballerup (DK)

( * ) Notice: Subject to any disclaimer, the term of this patent is extended or adjusted under 35 U.S.C. 154(b) by 11 days.

(21) Appl. No.: 17/499,762

(22) Filed: Oct. 12, 2021

(65) Prior Publication Data

US 2022/0150614 A1 May 12, 2022

(30) Foreign Application Priority Data

Nov. 12, 2020 (DK) ............................ PA202070746

(51) Int. Cl.
*H04R 1/10* (2006.01)

(52) U.S. Cl.
CPC .......... *H04R 1/105* (2013.01); *H04R 1/1016* (2013.01); *H04R 1/1066* (2013.01)

(58) Field of Classification Search
CPC .... H04R 1/105; H04R 1/1016; H04R 1/1066; H04R 25/60; H04R 25/656; H04R 2201/10; H04R 2225/67; H04R 2460/09
See application file for complete search history.

(56) References Cited

U.S. PATENT DOCUMENTS 5,048,090 A * 9/1991 Geers .................. H04R 25/607 381/328
6,418,230 B1 * 7/2002 McDonald .............. H04R 1/10 379/426
7,110,562 B1 * 9/2006 Feeley ................. H04R 25/607 381/328
7,715,581 B2 * 5/2010 Schanz ................ H04R 25/604 381/328
7,899,200 B2 * 3/2011 Karamuk ............ H04R 25/656 381/328
8,331,593 B2 * 12/2012 Slemming ........... H04R 25/656 381/318

(Continued)

FOREIGN PATENT DOCUMENTS

CN 209545832 U * 10/2019 ............... H04R 1/10
EP 1448014 A1 * 8/2004 ........... H04R 25/656

(Continued)

OTHER PUBLICATIONS

Foreign OA for Danish patent application No. PA 2020 70746 dated Aug. 24, 2021.

(Continued)

*Primary Examiner* — Oyesola C Ojo
(74) *Attorney, Agent, or Firm* — Vista IP Law Group, LLP

(57) ABSTRACT

Disclosed is an earpiece and a retaining member for an earpiece. The earpiece being configured for insertion into at least a part of the ear canal of a user's ear. The retaining member comprising a body part configured to be attached to the earpiece. The retaining member comprising an elongated part configured to abut at least a part of the concha of the user's ear, when the retaining member is attached to the earpiece and the earpiece is inserted in its intended position in the user's ear, thereby providing retention of the earpiece in the ear canal. The body part comprises an opening/slit/gap configured to be arranged on a protrusion on the earpiece.

29 Claims, 8 Drawing Sheets

(56) References Cited

U.S. PATENT DOCUMENTS

| | | | | |
|---|---|---|---|---|
| 8,374,367 B2 * | 2/2013 | Nielsen | H04R 25/652 381/328 |
| 8,666,102 B2 * | 3/2014 | Bruckhoff | A61F 11/08 381/328 |
| 10,250,964 B2 * | 4/2019 | McGarry | H04R 1/105 |
| 10,805,705 B2 * | 10/2020 | Rugolo | H04R 1/1066 |
| 2006/0067556 A1 * | 3/2006 | Bailey | H04R 1/105 381/328 |
| 2007/0036374 A1 * | 2/2007 | Bauman | H04R 25/60 381/312 |
| 2008/0025539 A1 * | 1/2008 | Bailey | H04R 25/75 381/322 |
| 2008/0123888 A1 * | 5/2008 | Schanz | H04R 25/656 381/328 |
| 2009/0052702 A1 * | 2/2009 | Murphy | H04R 1/1016 381/380 |
| 2009/0304216 A1 | 12/2009 | Hansen | |
| 2013/0058517 A1 * | 3/2013 | Lee | H04R 1/105 381/380 |
| 2014/0016808 A1 * | 1/2014 | Cherukuri | H04R 25/652 381/324 |
| 2014/0376756 A1 * | 12/2014 | Petersen | H04R 25/65 381/328 |
| 2015/0201291 A1 * | 7/2015 | Harris | H04R 25/652 381/328 |
| 2019/0261079 A1 * | 8/2019 | Okawa | H04R 1/105 |
| 2020/0021903 A1 * | 1/2020 | Trainer | H04R 1/105 |
| 2020/0154196 A1 * | 5/2020 | Kolton | H04R 1/1066 |
| 2020/0304896 A1 * | 9/2020 | Cohen | H04R 1/02 |

FOREIGN PATENT DOCUMENTS

| | | | | |
|---|---|---|---|---|
| EP | 1448014 A1 | 8/2004 | |
| EP | 2816822 A1 | 12/2014 | |
| WO | WO-2006026988 A1 * | 3/2006 | H04R 25/656 |
| WO | WO2006026988 A1 | 3/2006 | |
| WO | WO-2010040350 A1 * | 4/2010 | H04R 25/652 |
| WO | WO 2013/123992 | 8/2013 | |
| WO | WO2010040350 A1 | 4/2020 | |

OTHER PUBLICATIONS

Foreign OA for Danish patent application No. PA 2020 70746 dated Apr. 14, 2021.

Extended European Search Report for EP Patent Appln. No. EP 21206102.2 dated Mar. 23, 2022.

* cited by examiner

RETAINING MEMBER FOR EARPIECE OF HEARING DEVICE

RELATED APPLICATION DATA

This application claims priority to, and the benefit of, Danish Patent Application No. PA 2020 70746 filed on Nov. 12, 2020. The entire disclosure of the above application is expressly incorporated by reference herein.

FIELD

The present disclosure relates to an earpiece, a retaining member for an earpiece, and the use of the retaining member on the earpiece as a sportlock for a hearing device. The earpiece is configured for insertion into at least a part of the ear canal of a user's ear. The retaining member comprising a body part configured to be attached to the earpiece. The retaining member comprising an elongated part configured to abut at least a part of the concha of the user's ear, when the retaining member is attached to the earpiece and the earpiece is inserted in its intended position in the user's ear, thereby providing retention of the earpiece in the ear canal.

BACKGROUND

Retaining members, such as sportslock, for hearing devices are used to secure the earpiece of a hearing device in the ear, such as in the ear canal, of the user wearing the hearing device.

However, it is a problem of current sportslocks that they may be mounted on the earpiece in such a way that, if the sportslock is not pushed all the way on the earpiece, then the sportslock may be annoying the user's skin and/or may be interfering with a dome on the earpiece, which increases the risk that the dome falls off inside the ear canal of the user.

Thus, it is an object of the present disclosure to solve these problems.

SUMMARY

Disclosed is a retaining member for an earpiece. The earpiece being configured for insertion into at least a part of the ear canal of a user's ear. The retaining member comprising a body part configured to be attached to the earpiece. The retaining member comprising an elongated part configured to abut at least a part of the concha of the user's ear, when the retaining member is attached to the earpiece and the earpiece is inserted in its intended position in the user's ear, thereby providing retention of the earpiece in the ear canal. The body part comprises an opening/slit/gap configured to be arranged on a protrusion on the earpiece.

The retaining member may be a lock or a sportslock for an earpiece. The earpiece may be a housing of a hearing device. The purpose of the retaining member is to fixate or retain the earpiece in its position in the ear of the user, for example when the user moves a lot, such as when doing sports, to thereby avoid that the earpiece moves within the ear of the user, and to avoid that the earpiece falls out of the ear of the user.

It is an advantage that the retaining member, or sportslock, is configured to be attached to the earpiece, or housing, alike a belly band that is fixated with a protrusion in the housing, where this protrusion is fitting inside a slit formed in the retaining member so that the retaining member is fixated in the length direction of the earpiece.

Thereby, the retaining member is fixated to the earpiece to ensure that the retaining member does not fall off the earpiece.

The retaining member is an extra part which the hearing device user can choose to use for the earpiece, thus typically the hearing device will not be delivered to the user with the retaining member. The retaining member can be taken on and off the earpiece, depending on whether the user wishes to have the retaining member attached in a specific situation, e.g. when doing sports. Thus, it is an advantage that the retaining member is easy to attach and detach from the earpiece, as the user may attach or detach the retaining member every day, several times every day, every week or several times every months.

It is an advantage that due to the opening/slit/gap of the body part of the retaining member which fits on the protrusion of the earpiece, the body part of the retaining member will not move in the longitudinal direction of the earpiece.

It is an advantage that due to the opening/slit/gap of the body part of the retaining member which fits on the protrusion of the earpiece, the body part of the retaining member will not rotate around the earpiece.

Thus, the retaining member will be fixated in its position on the earpiece, thereby ensuring that the retaining member will not fall off the earpiece, and ensuring that the retaining member will not rotate on the earpiece.

It is an advantage that the retaining member cannot fall off the earpiece, neither in the lateral end of the earpiece, nor in the medial end of the earpiece. The lateral end of the earpiece is the back end of the earpiece, i.e. the end of the earpiece pointing towards the surroundings, when the earpiece is arranged in the user's ear in its intended position. The medial end of the earpiece is the front end of the earpiece, i.e. the end of the earpiece pointing towards the tympanic membrane in the ear canal, when the earpiece is arranged in the user's ear in its intended position.

If the retaining member could fall off the earpiece in the lateral end, then the retaining member could fall out of the user's ear and be lost. Thus, it is an advantage that the retaining member cannot be lost.

If the retaining member could fall off or move along the earpiece in the medial end, then the retaining member could push to a dome attached in the medial end of the earpiece. Thus, it is an advantage that retaining member cannot push to the dome, since hereby it is avoided that the dome falls off the earpiece into the user's ear canal.

Thus, the retaining member solves the interference issue with the dome.

It is a further advantage of the retaining member that the retaining member is configured to be attached in the lateral end of the earpiece, since this provides that the medial end of the earpiece is as small as possible, because there is no retaining member in the medial end, and when the earpiece is as small as possible in the medial end, then this ensures a good fit of the earpiece in the ear canal.

The retaining member may be a sportslock or lock for retaining or fixating the earpiece in the ear or ear canal of the user.

The earpiece may be a hearing device housing, a receiver, a receiver housing, a loudspeaker housing, a speaker housing, a receiver-in-ear (RIE) part, a receiver-in-the-ear (RITE) part, an in-the-ear (ITE) part, a completely-in-canal (CIC) part etc.

Different receivers may be available for a hearing device. For example, low-power receivers, medium-power receivers, high-power receivers, and/or ultra-power receivers may be available. The power type of receiver may be selected to correspond to the user's hearing loss, i.e. if the user has a mild hearing loss, a low-power receiver may be sufficient. If the user has a moderate hearing loss, a medium-power receiver may be suitable. If the user has a severe hearing loss, a high-power receiver may be required. However, medium and/or high power receivers may also be used for mild hearing loss, since their output energy can be limited to the need of the individual hearing loss.

The earpiece may be for a hearing device, such as a hearing aid, such as a behind-the-ear (BTE) hearing aid, an over-the-counter (OTC) hearing aid etc.

The earpiece is configured for insertion into at least a part of the ear canal of a user's ear. Thus, the earpiece may be configured to be inserted partly in the ear canal, such as being arranged both in the ear canal and at the concha of the user's ear. The earpiece may be configured to be inserted completely in the ear canal.

The retaining member comprises a body part configured to be attached to the earpiece. The body part may be attached or arranged around the earpiece, such as like a belly band. The body part may be like a hollow cover, where the earpiece can at least partly fit into.

The retaining member comprises an elongated part. The elongated part is configured to abut at least a part of the concha of the user's ear, when the retaining member is attached to the earpiece and the earpiece is inserted in its intended position in the user's ear, thereby providing retention of the earpiece in the ear canal. The elongated part may be flexible, bendable or resilient. The elongated part may abut to parts of the outer ear for fixing the earpiece in the ear canal. Thus, the elongated part of the retaining member is for retaining the earpiece in the user's ear canal or ear. The elongated part provides the retention by abutting at least a part of the concha of the user's ear. The concha may be shaped like a rounded depression, thus the elongated part of the retaining member may abut the rounded depression of the concha thereby providing retention of the earpiece in the ear or ear canal. The elongated part is elongated and can thereby be bended to fit in the concha.

The body part comprises an opening, slit, hole, perforation, slot or gap, which is configured to be arranged on a protrusion on the earpiece. Thus, the body part comprises a slit which may be configured to be arranged to, on, around, or over a protrusion on the earpiece. Thus, the slit may be configured to be removably arranged, fixed, or attached to the protrusion on the earpiece. Thus, the body part of the retaining member comprises a slit to fit over a protrusion in the earpiece to thereby secure the position of the body part on the earpiece. The material thickness of the body part may correspond to the height of the protrusion, such that the protrusion is flush with the body part, when the retaining member is arranged on the earpiece, whereby the protrusion is not protruding out of the slit.

Disclosed is also an earpiece configured for attachment of a retaining member. The earpiece being configured for insertion into at least a part of the ear canal of a user's ear. The earpiece comprising a protrusion. The retaining member comprising a body part configured to be attached to the earpiece. The retaining member comprising an elongated part configured to abut at least a part of the concha of the user's ear, when the retaining member is attached to the earpiece and the earpiece is inserted in its intended position in the user's ear, thereby providing retention of the earpiece in the ear canal. The body part comprises an opening/slit/gap configured to be arranged on the protrusion on the earpiece.

The protrusion on the earpiece may be arranged on a transversal side of the earpiece, for securing the position of the body part of the retaining member on the earpiece.

Disclosed is also the use of a retaining member for an earpiece as a sports lock for a hearing device.

The retaining member and earpiece may be for a hearing device.

The hearing device may be a headset or a hearing aid. The hearing device may comprise a behind-the-ear (BTE) unit and the earpiece, e.g. a receiver or receiver-in-ear (RIE) unit or microphone-and-receiver-in-ear (MaRIE) unit. The BTE unit typically comprises most of the electronics of the hearing device except for the receiver. However, in a MaRIE unit, there is both microphone(s) and receiver on the earpiece. The hearing device may comprise a first input transducer, e.g. a microphone, to generate one or more microphone output signals based on a received audio signal. The audio signal may be an analogue signal. The microphone output signal may be a digital signal. Thus, the first input transducer, e.g. microphone, or an analogue-to-digital converter, may convert the analogue audio signal into a digital microphone output signal. All the signals may be sound signals or signals comprising information about sound. The hearing device may comprise a signal processor. The one or more microphone output signals may be provided to the signal processor for processing the one or more microphone output signals. The signals may be processed such as to compensate for a user's hearing loss or hearing impairment. The signal processor may provide a modified signal. All these components may be comprised in a housing of the BTE unit. The hearing device may comprise a receiver or output transducer or speaker or loudspeaker. The receiver may be connected to an output of the signal processor. The receiver may output the modified signal into the user's ear. The receiver, or a digital-to-analogue converter, may convert the modified signal, which is a digital signal, from the processor to an analogue signal. The receiver may be comprised in the earpiece, e.g. RIE unit or MaRIE unit. The hearing device may comprise more than one microphone, and the BTE unit may comprise at least one microphone and the RIE unit may also comprise at least one microphone.

The hearing device signal processor may comprise elements such as an amplifier, a compressor and/or a noise reduction system etc. The signal processor may be implemented in a signal-processing chip or a printed circuit board (PCB). The hearing device may further have a filter function, such as compensation filter for optimizing the output signal.

The hearing device may furthermore comprise a wireless communication unit, such as a wireless communication circuit, for wireless data communication interconnected with an antenna, such as an radio frequency (RF) antenna or a magnetic induction antenna, for emission and reception of an electromagnetic field. The wireless communication unit including a radio or a transceiver, may connect to the hearing device signal processor and the antenna, for communicating with one or more external devices, such as one or more external electronic devices, including at least one smart phone, at least one tablet, at least one hearing accessory device, including at least one spouse microphone, remote control, audio testing device, etc., or, in some embodiments, with another hearing device, such as another hearing device located at another ear, typically in a binaural hearing device system.

The hearing device may be any hearing device, such as any hearing device compensating a hearing loss of a wearer of the hearing device, or such as any hearing device providing sound to a wearer, or such as a hearing device providing noise cancellation, or such as a hearing device providing tinnitus reduction/masking. The person skilled in the art is well aware of different kinds of hearing devices and of different options for arranging the hearing device in and/or at the ear of the hearing device wearer.

For example, the hearing device may be a Receiver-In-Canal (RIC) or Receiver-In-the-Ear (RIE or RITE) or a Microphone-and-Receiver-In-the-Ear (MaRIE) type hearing device, in which a receiver is positioned in the ear, such as in the ear canal, of a wearer during use, for example as part of an in-the-ear unit, while other hearing device components, such as a processor, a wireless communication unit, a battery, etc. are provided as an assembly and mounted in a housing of a Behind-The-Ear (BTE) unit. A plug and socket connector may connect the BTE unit and the earpiece, e.g. RIE unit or MaRIE unit.

The hearing device may comprise a RIE unit. The RIE unit typically comprises the earpiece such as a housing, a plug connector, and an electrical wire/tube connecting the plug connector and earpiece. The earpiece may comprise an in-the-ear housing, a receiver, such as a receiver configured for being provided in an ear of a user and/or a receiver being configured for being provided in an ear canal of a user, and an open or closed dome. The dome may support correct placement of the earpiece in the ear of the user. The RIE unit may comprise a microphone, a receiver, one or more sensors, and/or other electronics. Some electronic components may be placed in the earpiece, while other electronic components may be placed in the plug connector. The receiver may be with a different strength, i.e. low power, medium power, or high power. The electrical wire/tube provides an electrical connection between electronic components provided in the earpiece of the RIE unit and electronic components provided in the BTE unit. The electrical wire/tube as well as the RIE unit itself may have different lengths.

In some embodiments, the body part of the retaining member is configured to be attached to the earpiece along a longitudinal axis, the longitudinal axis extending from a lateral end to a medial end of the earpiece. The lateral end of the earpiece may be the back end of the earpiece pointing towards the surroundings. The medial end of the earpiece may be the front end of the earpiece pointing towards the tympanic membrane inside the ear. The body part of the retaining member is configured to be removably attached to the earpiece along a longitudinal axis, as the user may attach and detach the retaining member to the earpiece.

In some embodiments, the slit of the body part of the retaining member is provided along a first transversal axis, the first transversal axis being perpendicular to the longitudinal axis. The earpiece may be shaped like a cylinder, thus there may be one longitudinal direction along a center longitudinal axis. There may be more transversal directions, which are all perpendicular to the longitudinal directions. The longitudinal direction may be termed the x direction. The transversal directions may be termed the y and z direction.

In some embodiments, the slit of the body part of the retaining member is provided along a second transversal axis, the second transversal axis being perpendicular to the longitudinal axis. The second transversal axis may also be perpendicular to the first transversal axis In some embodiments, the body part is configured to encase/enclose the earpiece in the transversal direction(s) of the earpiece. Thus, the body part may be arranged around the earpiece like a belly band.

In some embodiments, the body part is ring-shaped having an inner perimeter/circumference, wherein the inner perimeter/circumference is configured to adjoin the earpiece. If the body part has a round ring-shaped form, then the inner circumference of the body part is configured to adjoin, e.g. fit to the outer shape/circumference of the earpiece. In this case, the earpiece may have a round shape as well. Instead of having a round ring-shaped form, the body part may rectangularly shaped. If the body part has a rectangularly ring-shaped form, then the inner perimeter of the body part is configured to adjoin, e.g. fit to the outer shape/perimeter of the earpiece. In this case, the earpiece may have a rectangular shape as well. The body part may be ring-shaped, circularly shaped, rectangularly shaped etc. If the earpiece has a rectangular shape, then the corners of the earpiece may rounded off, or the corners may be sharp. It is an advantage to have a rectangularly shaped body part and a rectangularly shaped earpiece, since this may prevent the body part from rotating around the earpiece.

In some embodiments, the body part is rectangularly shaped along the longitudinal axis, whereby the body part comprises four surfaces, where a first surface and a third surface of the four surfaces are opposite each other, and where a second surface and a fourth surface of the four surfaces are opposite each other, and where the first surface and the third surface are perpendicular to the second surface and the fourth surface. The body part may alternatively and/or additionally be rectangularly shaped in the second transversal direction. In some embodiments, the body part is circularly shaped along the longitudinal axis.

In some embodiments, the body part is polygonally shaped along a longitudinal axis. The body part may comprise four primary surfaces, where a first primary surface and a third primary surface of the four primary surfaces are opposite each other, and where a second primary surface and a fourth primary surface of the four surfaces are opposite each other, and where the first primary surface and the third primary surface are perpendicular to the second primary surface and the fourth primary surface. The body part may comprise four secondary surfaces, where each secondary surface is provided between two primary surfaces. The body part may comprise two secondary surfaces, where each secondary surface is provided between two primary surfaces.

Thus, the cross-section of the earpiece along the part where the retaining member is fixed or the cross-section of the earpiece near the protrusion may have a specific shape, e.g. rectangular or rounded.

In some embodiments, the opening/slit/gap of the body part is provided in one of the four surfaces.

In some embodiments, the first surface is configured to point upwards, when the retaining member is attached to the earpiece and the earpiece is inserted in its intended position in the user's ear, and wherein the opening/slit/gap of the body part is provided in the first surface. In for example earpieces with low power and medium power receivers, the slit may be provided in the first surface of the body part. The reason for this configuration may be due to the manufacturing process of the earpiece receiver.

In some embodiments, the second surface is configured to point sidewards, when the retaining member is attached to the earpiece and the earpiece is inserted in its intended position in the user's ear, and wherein the opening/slit/gap of the body part is provided in the second surface. In for example earpieces with high power receivers, the slit may be provided in the second surface of the body part. The reason for this configuration may be due to the manufacturing process of the earpiece receiver.

In some embodiments, the retaining member is configured to be attached to the lateral end of the earpiece. The lateral end is the back end of the earpiece pointing towards the surroundings. This may ensure that the retaining member does not interfere with the dome. It is furthermore an advantage to have the retaining member as far back as possible on the earpiece, since hereby retaining member will not be close to the ear canal, as this could compromise comfort for the user. It may be very unpleasant for the user if there are many parts or big parts in the ear canal.

In some embodiments, the opening/slit/gap of the body part has a first length in a transversal direction and a second length in a longitudinal direction. The directions may correspond to the first or the second transversal direction of the earpiece. The first length and the second length may be different lengths or the same length. If the lengths are different, the slit may be oblong.

In some embodiments, the opening/slit/gap of the body part is shaped like a rectangular, a circle, a cylinder, an oval, a polygon etc. The slit may have a rounded shape, such as rounded corners, as it may be easier to fit the retaining member on the earpiece if the slit has a rounded shape.

In some embodiments, the opening/slit/gap of the body part is larger than the protrusion on the earpiece. Thus is an advantage as it may be easier to slide the slit of the body part over the protrusion on the earpiece when there is some extra space or tolerances between the parts. The material thickness of the body part corresponds to the height of the protrusion, such that the protrusion is flush with the body part, when the retaining member is arranged on the earpiece, whereby the protrusion is not protruding out of the slit.

In some embodiments, the elongated part of the retaining member is connected on the body part on a surface pointing downwards, when the retaining member is attached to the earpiece and the earpiece is inserted in its intended position in the user's ear. The surface pointing downwards in use may be the third surface of the body part. The retaining member's body part and elongated part may be manufactured as one piece or as two pieces. The retaining member may be manufactured by injection moulding, and the injection moulding tool inlet tip may be at the connection of the body part and the elongated part, and at the connection of the two parts there may be a small residue material from the injection moulding process, and this residue may annoy the skin of the user. When the connection, and this potential residue is at the surface of the retaining member pointing downwards in use, then this potential residue may annoy the skin as little as possible, as the retaining member may not touch the user's skin at the connection between the body part and the elongated part.

In some embodiments, the elongated part of the retaining member is configured to be bended to follow the shape of the concha from below to up, when the retaining member is attached to the earpiece and the earpiece is inserted in its intended position in the user's ear. Thus, the elongated part may bend from the bottom part of the concha close to the ear canal opening, and then may bend upwards along the concha following the anti-helix towards the fossa triangularis/helix of the user's ear.

In some embodiments, the elongated part of the retaining member is arranged on the body part opposite to the opening/slit/gap of the body part. This configured may apply to low power and medium power receivers.

In some embodiments, the retaining member is made of a plastics material, such as a medical grade plastic.

In some embodiments, the plastics material is defined by a flexibility having a Shore A durometer value of between about 25 to 70. The Shore A durometer value may be between 50 to 70, such as between 55 to 62. This flexibility of the retaining member provides that the body part can be pushed over the protrusion to a "locking" position on the earpiece when the protrusion is at the slit/opening/gap of the body part.

In some embodiments, the elongated part comprises segments which provide flexibility.

In some embodiments, the elongated part is longer than the body part in every direction/dimension. Thus, the elongated part may be twice as long as the largest dimension of the body part. The elongated part may be three times as long as the largest dimension of the body part. The elongated part may be four times as long as the largest dimension of the body part. The elongated part may be five times as long as the largest dimension of the body part. The elongated part may be six times as long as the largest dimension of the body part etc.

In some embodiments, the elongated part of the retaining member has a length of about 2.5 cm-4.5 cm, and wherein the body part of the retaining member has a size of about 0.2 cm-0.6 cm in each dimension/direction.

In some embodiments, the earpiece is a receiver/output transducer/loudspeaker of a hearing device, and wherein the earpiece is configured to be connected to a behind-the-ear housing of the hearing device.

In some embodiments, a dome is configured to be attached to the earpiece in the medial end. The medial end is the end of the earpiece pointing inwards towards the tympanic membrane in the ear. Thus, it is an advantage that the retaining member in the lateral end of the earpiece does not interfere with the dome, which reduced the risk that the dome will fall off the earpiece in the ear canal.

The present disclosure relates to different aspects including the retaining member described above and in the following, and corresponding earpieces, hearing devices, systems, system parts, methods, devices, kits, uses and/or product means, each yielding one or more of the benefits and advantages described in connection with the first mentioned aspect, and each having one or more embodiments corresponding to the embodiments described in connection with the first mentioned aspect and/or disclosed in the appended claims.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1A:
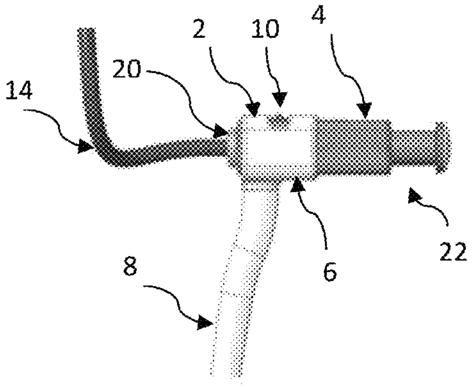
FIG. 1A-1F schematically illustrates an example of a retaining member 2 for an earpiece 4.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Throughout, the same reference numerals are used for identical or corresponding parts.

FIG. 1A-1F schematically illustrates an example of a retaining member 2 for an earpiece 4. The earpiece 2 is configured for insertion into at least a part of the ear canal of a user's ear. The retaining member 2 comprising a body part 6 configured to be attached to the earpiece 4. The retaining member 2 comprising an elongated part 8 configured to abut at least a part of the concha of the user's ear, when the retaining member 2 is attached to the earpiece 4 and the earpiece 4 is inserted in its intended position in the user's ear, thereby providing retention of the earpiece 4 in the ear canal. The body part 6 comprises an opening/slit/gap 10 configured to be arranged on a protrusion 12 on the earpiece 4.

The retaining member 2 and the earpiece 4 are seen on a side view.

A wire/cable 14 is connecting the earpiece 4 with a behind-the-ear unit (not shown).

Figure 1B:
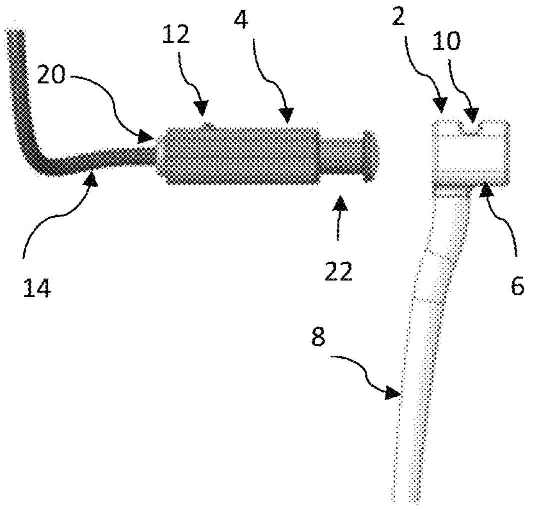

FIGS. 1A and 1B show examples of low power receivers. In FIG. 1A, the retaining member 2 is attached to the earpiece 4. In FIG. 1B, the retaining member 2 and the earpiece 4 are detached from each other.

Figure 1C:
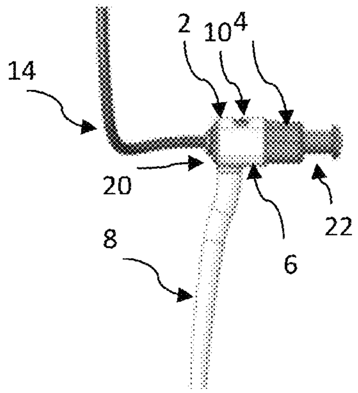
Figure 1D:
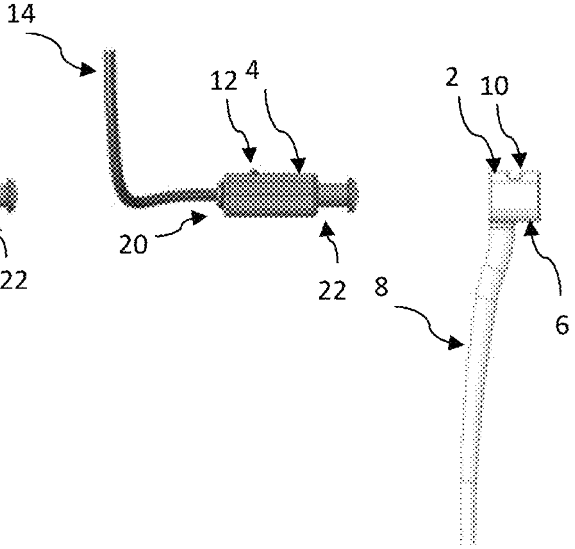

FIGS. 1C and 1D show examples of medium power receivers. In FIG. 1C, the retaining member 2 is attached to the earpiece 4. In FIG. 1D, the retaining member 2 and the earpiece 4 are detached from each other.

Figure 1E:
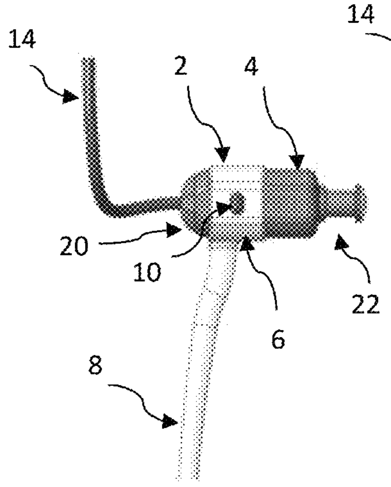
Figure 1F:
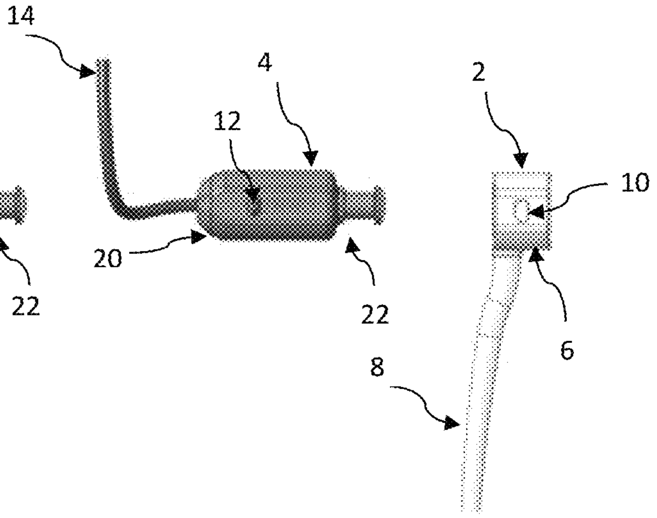

FIGS. 1E and 1F show examples of high power receivers. In FIG. 1E, the retaining member 2 is attached to the earpiece 4. In FIG. 1F, the retaining member 2 and the earpiece 4 are detached from each other.

The retaining member 2 is configured to be attached to the lateral end 20 of the earpiece 4.

The slit 10 of the body part 6 has a first length in a transversal direction and a second length in a longitudinal direction.

The slit 10 of the body part 6 is shaped like a rectangular, a circle, a cylinder, an oval, a polygon etc.

The slit 10 of the body part 6 is larger than the protrusion 12 on the earpiece 4.

The elongated part 8 is longer than the body part 6 in every direction/dimension.

FIG. 1A-1D shows that the body part 6 is rectangularly shaped along a longitudinal axis. The body part 6 comprises four surfaces 16*a*, 16*b*, 16*c*, 16*d* (please see FIG. 3), where a first surface 16*a* and a third surface 16*c* of the four surfaces are opposite each other, and where a second surface 16*b* and a fourth surface 16*d* of the four surfaces are opposite each other, and where the first surface 16*a* and the third surface 16*c* are perpendicular to the second surface 16*b* and the fourth surface 16*d*.

The opening/slit/gap 10 of the body part 6 is provided in one of the four surfaces 16.

The first surface 16*a* is configured to point upwards, when the retaining member 2 is attached to the earpiece 4 and the earpiece 4 is inserted in its intended position in the user's ear.

In FIGS. 1A-1D, the slit 10 of the body part 6 is provided in the first surface 16*a*.

In FIGS. 1A-1D, the elongated part 8 of the retaining member 2 is arranged on the body part 6 opposite to the slit 10 of the body part 6.

FIG. 1E-1F shows that the body part 6 is polygonally shaped along a longitudinal axis. The body part 6 comprises four primary surfaces 16*a*, 16*b*, 16*c*, 16*d* (please see FIG. 3), where a first surface 16*a* and a third surface 16*c* of the four surfaces are opposite each other, and where a second surface 16*b* and a fourth surface 16*d* of the four surfaces are opposite each other, and where the first surface 16*a* and the third surface 16*c* are perpendicular to the second surface 16*b* and the fourth surface 16*d*. The body part 6 may comprise e.g. two secondary surfaces or four secondary surfaces, where each secondary surface is provided between two primary surfaces 16.

The opening/slit/gap 10 of the body part 6 is provided in one of the four primary surfaces 16.

The second surface 16*b* is configured to point sidewards, when the retaining member 2 is attached to the earpiece 4 and the earpiece 4 is inserted in its intended position in the user's ear.

In FIG. 1E-1F, the slit 10 of the body part 6 is provided in the second surface 16*b*.

In all FIGS. 1, the elongated part 8 of the retaining member 2 is connected on the body part 6 on the surface 16*c* pointing downwards, when the retaining member 2 is attached to the earpiece 4 and the earpiece 4 is inserted in its intended position in the user's ear.

FIG. 2A-2I schematically illustrates an example of a retaining member 2 for an earpiece 4. The earpiece 2 is configured for insertion into at least a part of the ear canal of a user's ear. The retaining member 2 comprising a body part 6 configured to be attached to the earpiece 4. The retaining member 2 comprising an elongated part 8 configured to abut at least a part of the concha of the user's ear, when the retaining member 2 is attached to the earpiece 4 and the earpiece 4 is inserted in its intended position in the user's ear, thereby providing retention of the earpiece 4 in the ear canal. The body part 6 comprises an opening/slit/gap 10 configured to be arranged on a protrusion 12 on the earpiece 4.

A wire/cable 14 is connecting the earpiece 4 with a behind-the-ear unit 24.

Figure 2A:
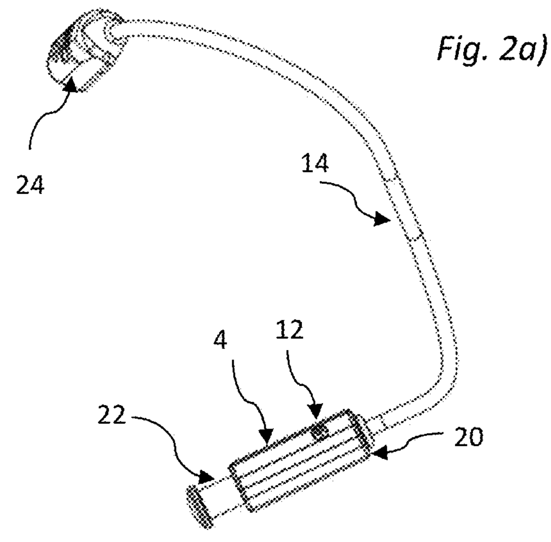
FIG. 2A-2I schematically illustrates an example of a retaining member 2 for an earpiece 4.
Figure 2B:
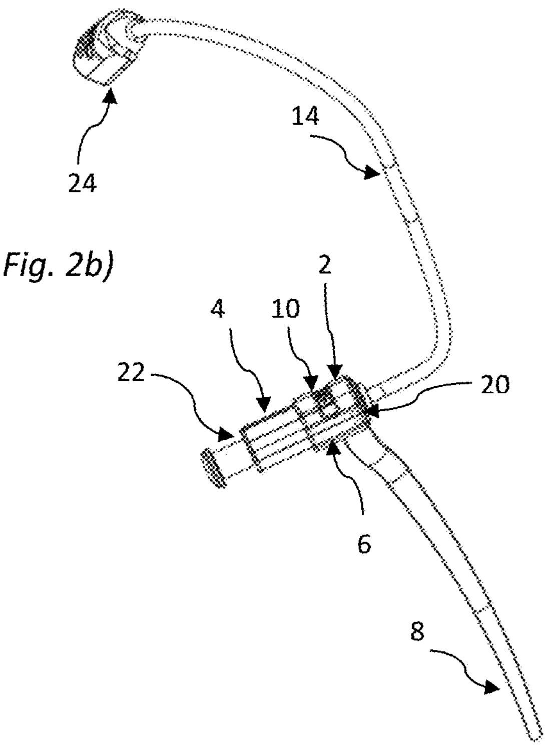
Figure 2C:
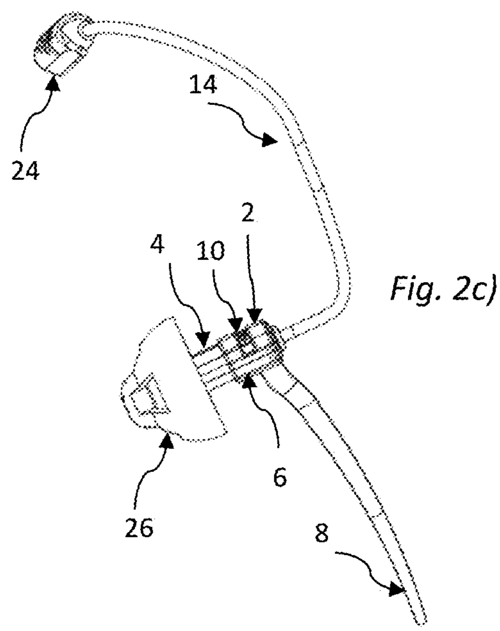

FIG. 2A-2C show examples of low power receivers. In FIG. 2A, the retaining member 2 and the earpiece 4 are detached from each other. In FIG. 2B, the retaining member 2 is attached to the earpiece 4. In FIG. 2C, the retaining member 2 is attached to the earpiece 4, and the dome 26 is attached to the earpiece.

Figure 2D:
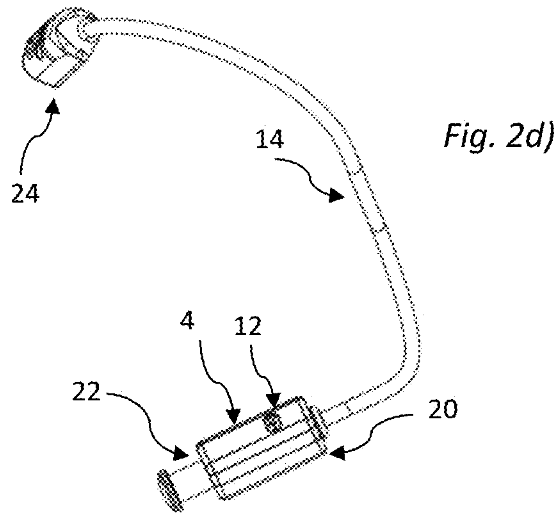
Figure 2E:
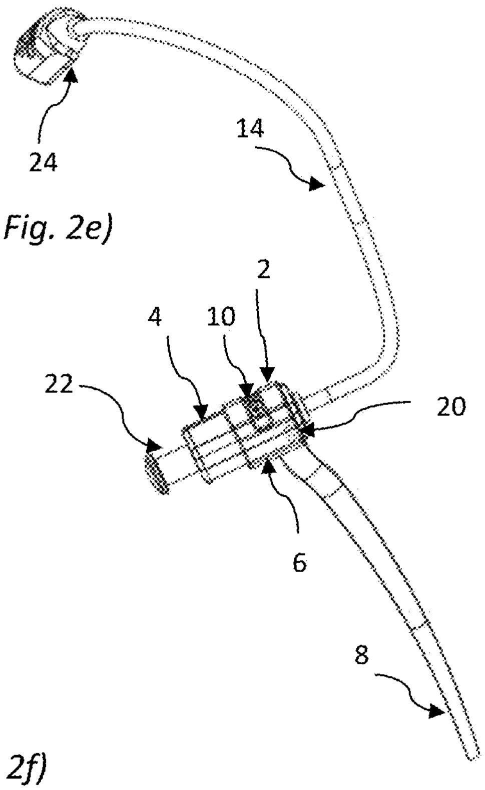
Figure 2F:
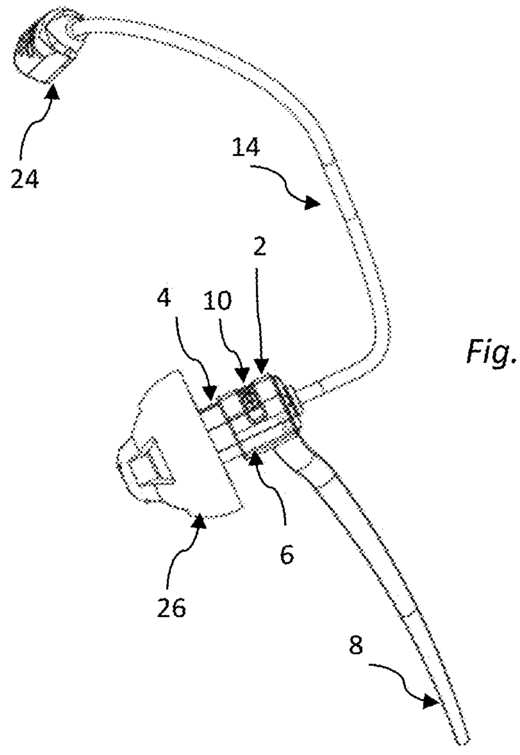

FIG. 2D-2F show examples of medium power receivers. In FIG. 2D, the retaining member 2 and the earpiece 4 are detached from each other. In FIG. 2E, the retaining member 2 is attached to the earpiece 4. In FIG. 2F, the retaining member 2 is attached to the earpiece 4, and the dome 26 is attached to the earpiece.

Figure 2G:
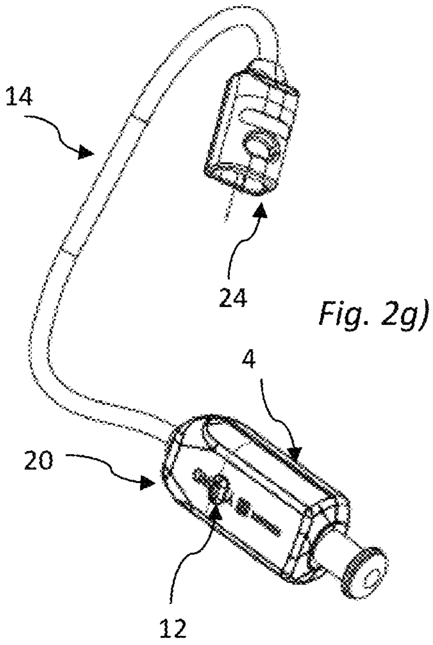
Figure 2H:
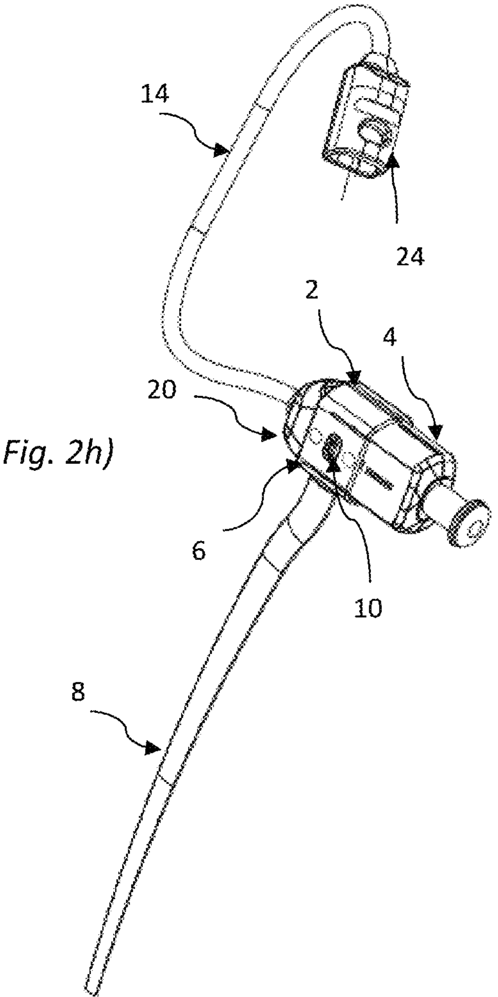
Figure 2I:
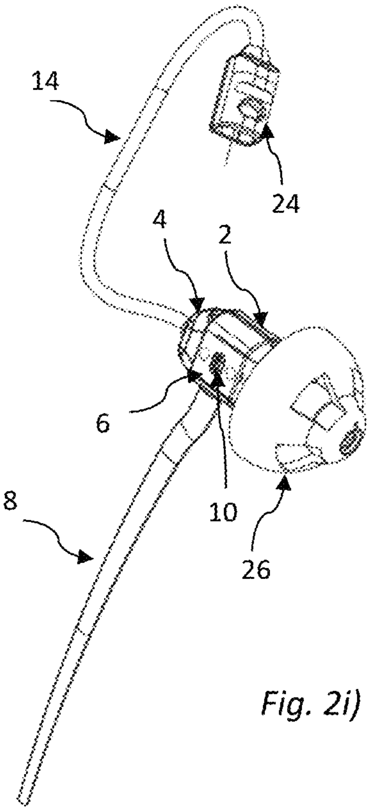

FIG. 2G-2I show examples of high power receivers. In FIG. 2G, the retaining member 2 and the earpiece 4 are detached from each other. In FIG. 2H, the retaining member 2 is attached to the earpiece 4. In FIG. 2I, the retaining member 2 is attached to the earpiece 4, and the dome 26 is attached to the earpiece.

The elongated part 8 is arranged in the lateral end 20 of the earpiece 4. The dome 26 is arranged in the medial end 22 of the earpiece.

Figure 3:
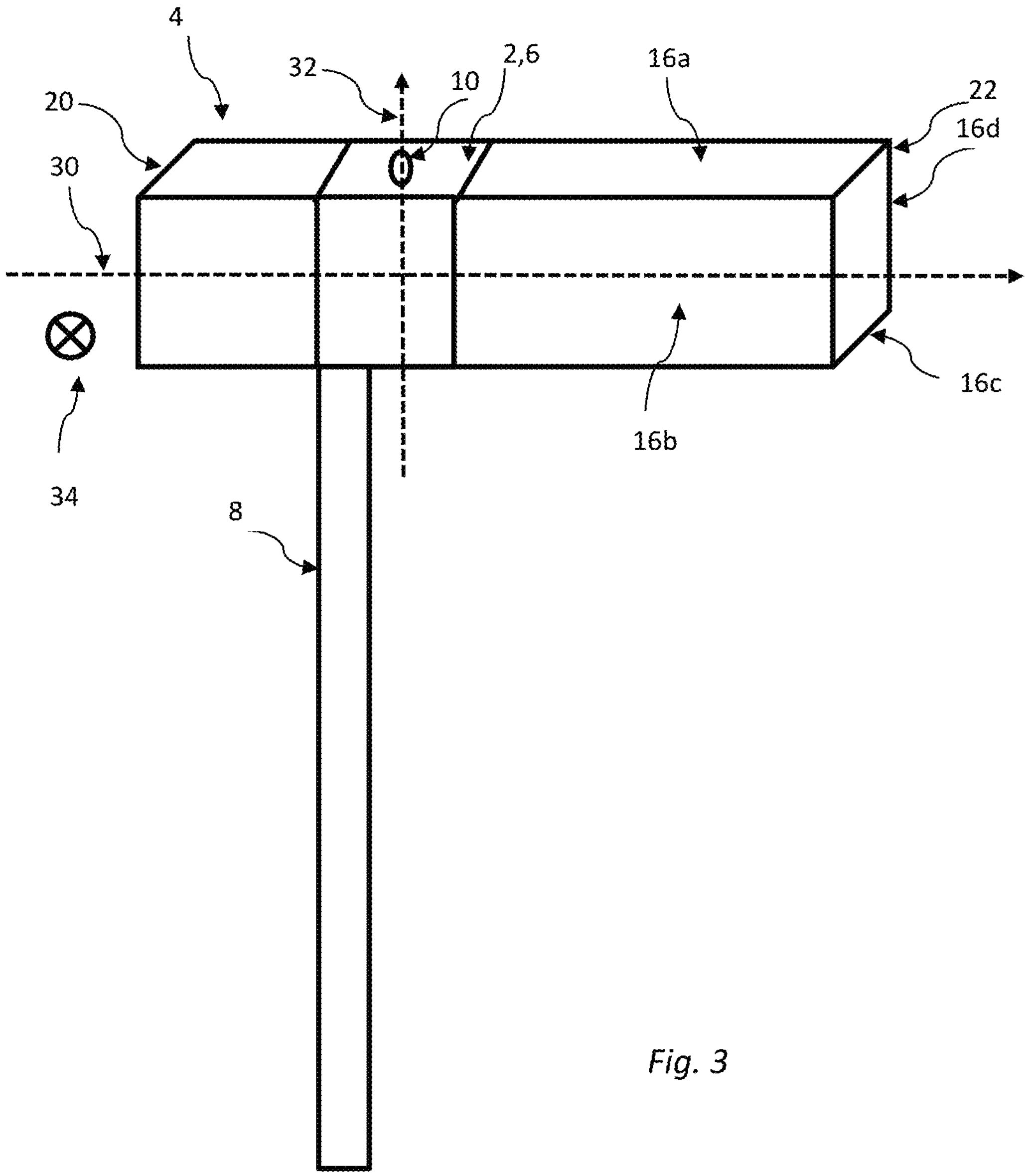
FIG. 3 schematically illustrates a retaining member 2 comprising an elongated part 8 and a body part 6.

FIG. 3 schematically illustrates a retaining member 2 comprising an elongated part 8 and a body part 6.

The body part 6 of the retaining member 2 is configured to be attached to the earpiece 4 along a longitudinal axis 30, the longitudinal axis 30 extending from a lateral end 20 to a medial end 22 of the earpiece 4.

The slit 10 of the body part 6 of the retaining member 2 is provided along a first transversal axis 32, the first transversal axis 32 being perpendicular to the longitudinal axis 30. This may apply to the low power and medium power receivers in FIG. 1A-1D.

Alternatively, the slit 10 of the body part 6 of the retaining member 2 is provided along a second transversal axis 34, the second transversal axis 34 being perpendicular to the longitudinal axis 30, and to the first transversal axis 32. This may apply to the high power receiver in FIG. 1E-1F.

The body part 6 is configured to encase or enclose the earpiece 2 in the transversal direction(s) 32, 34 of the earpiece 2.

The body part 6 may be ring-shaped having an inner perimeter/circumference, wherein the inner perimeter/circumference is configured to adjoin the earpiece 2.

The body part 6 may be rectangularly shaped along the longitudinal axis 30, whereby the body part 6 comprises four surfaces 16*a*, 16*b*, 16*c*, 16*d*, where a first surface 16*a* and a third surface 16*c* of the four surfaces are opposite each other, and where a second surface 16*b* and a fourth surface 16*d* of the four surfaces are opposite each other, and where the first surface 16*a* and the third surface 16*c* are perpendicular to the second surface 16*b* and the fourth surface 16*d*.

The slit 10 of the body part 6 is provided in one of the four surfaces 16.

Figure 4:
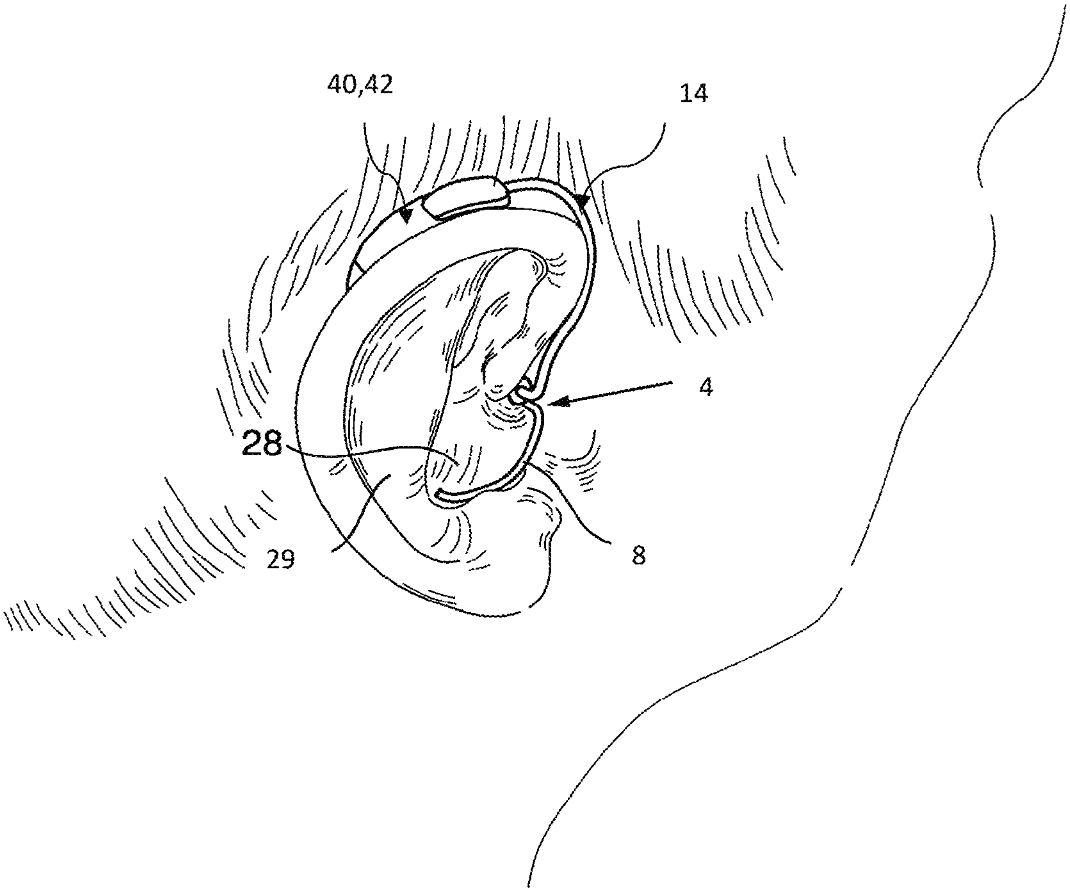
FIG. 4 schematically illustrates an example of an earpiece 4 arranged in the ear of a user.

FIG. 4 schematically illustrates an example of an earpiece 4 arranged in the ear of a user. The earpiece 4 is configured for attachment of a retaining member. The earpiece 4 is configured for insertion into at least a part of the ear canal of a user's ear. The earpiece comprising a protrusion (not visible). The retaining member comprises a body part configured to be attached to the earpiece 4. The retaining member comprises an elongated part 8 configured to abut at least a part of the concha 28 of the user's ear, when the retaining member is attached to the earpiece 4 and the earpiece 4 is inserted in its intended position in the user's ear, thereby providing retention of the earpiece 4 in the ear canal.

The elongated part 8 may bend from the bottom part of the concha 28 close to the ear canal opening, and then may bend upwards along the concha 28 following the anti-helix 29 towards the fossa triangularis/helix of the user's ear.

The earpiece 4 may be a receiver/output transducer/loudspeaker of a hearing device 40. The earpiece 4 is configured to be connected to a behind-the-ear housing 42 of the hearing device 40 through a cable/wire 14.

Figure 5:
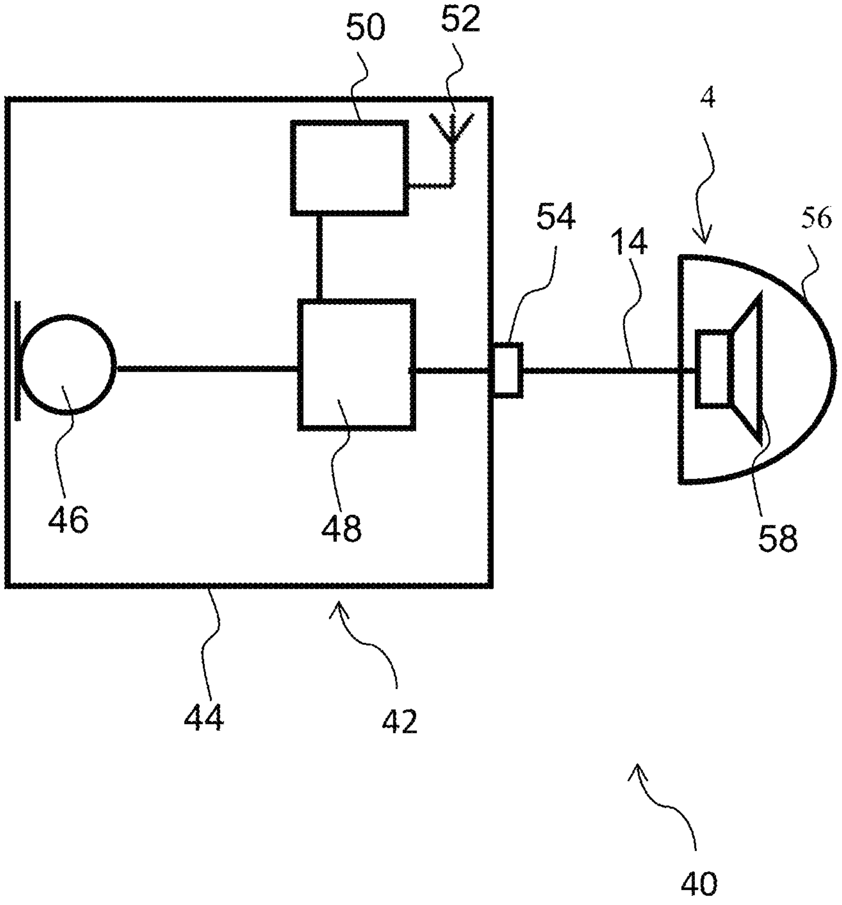
FIG. 5 schematically illustrates a hearing device 40 comprising an earpiece 4 and a BTE unit 42.

FIG. 5 schematically illustrates a hearing device 40 comprising an earpiece 4 and a BTE unit 42. The BTE unit 42 comprises a housing 44. The BTE unit 42 may comprise a first transducer, e.g. a microphone 46, to generate one or more microphone output signals based on a received audio signal. The one or more microphone output signals may be provided to a signal processor 48 for processing the one or more microphone output signals. The BTE unit 42 may furthermore comprise a wireless communication unit 50, such as a wireless communication circuit, for wireless data communication interconnected with an antenna 52, such as an radio frequency (RF) antenna or a magnetic induction antenna, for emission and reception of an electromagnetic field. The wireless communication unit 50, including a radio or a transceiver, may connect to the hearing device signal processor 48 and the antenna 52, for communicating with one or more external devices, such as one or more external electronic devices, including at least one smart phone, at least one tablet, at least one hearing accessory device, including at least one spouse microphone, remote control, audio testing device, etc., or, in some embodiments, with another hearing device, such as another hearing device located at another ear, typically in a binaural hearing device system.

The earpiece 4 may comprise a plug connector 54, an electrical wire/tube 14 and a housing 56. The plug connector 54 and electrical wire/tube 14 is configured to mechanically and electrically connect the earpiece 4 to the BTE unit 42. The earpiece 4 may comprise a receiver or speaker 58 for supplying a receiver output signal to the ear canal of the user. The receiver or speaker 58 may be connected to an output of the signal processor 48, wherein the output signal of the signal processer may be modified to compensate for a user's hearing impairment, and the signal processor 48 may provide the modified signal to the speaker 58. This connection may be established through the plug connector 54.

Although particular features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications and equivalents.

ITEMS

1. A retaining member for an earpiece, the earpiece being configured for insertion into at least a part of the ear canal of a user's ear, the retaining member comprising:
   a body part configured to be attached to the earpiece; and
   an elongated part configured to abut at least a part of the concha of the user's ear, when the retaining member is attached to the earpiece and the earpiece is inserted in its intended position in the user's ear, thereby providing retention of the earpiece in the ear canal;
   wherein the body part comprises a slit configured to be arranged on a protrusion on the earpiece.
2. The retaining member according to any of the previous items, wherein the body part of the retaining member is configured to be attached to the earpiece along a longitudinal axis, the longitudinal axis extending from a lateral end to a medial end of the earpiece.
3. The retaining member according to any of the previous items, wherein the slit of the body part of the retaining member is provided along a first transversal axis, the first transversal axis being perpendicular to the longitudinal axis.
4. The retaining member according to any of the previous items, wherein the slit of the body part of the retaining member is provided along a second transversal axis, the second transversal axis being perpendicular to the longitudinal axis.
5. The retaining member according to any of the previous items, wherein the body part is configured to encase the earpiece in the transversal direction(s) of the earpiece.
6. The retaining member according to any of the previous items, wherein the body part is ring-shaped having an inner perimeter/circumference, wherein the inner perimeter/circumference is configured to adjoin the earpiece.

7. The retaining member according to any of the previous items, wherein the body part is rectangularly shaped along the longitudinal axis, whereby the body part comprises four surfaces, where a first surface and a third surface of the four surfaces are opposite each other, and where a second surface and a fourth surface of the four surfaces are opposite each other, and where the first surface and the third surface are perpendicular to the second surface and the fourth surface.
8. The retaining member according to any of the previous items, wherein the opening/slit/gap of the body part is provided in one of the four surfaces.
9. The retaining member according to any of the previous items, wherein the first surface is configured to point upwards, when the retaining member is attached to the earpiece and the earpiece is inserted in its intended position in the user's ear, and wherein the slit of the body part is provided in the first surface.
10. The retaining member according to any of the previous items, wherein the second surface is configured to point sidewards, when the retaining member is attached to the earpiece and the earpiece is inserted in its intended position in the user's ear, and wherein the slit of the body part is provided in the second surface.
11. The retaining member according to any of the previous items, wherein the retaining member is configured to be attached to the lateral end of the earpiece.
12. The retaining member according to any of the previous items, wherein the slit of the body part has a first length in a transversal direction and a second length in a longitudinal direction.
13. The retaining member according to any of the previous items, wherein the slit of the body part is shaped like a rectangular, a circle, a cylinder, an oval, a polygon etc.
14. The retaining member according to any of the previous items, wherein the slit of the body part is larger than the protrusion on the earpiece.
15. The retaining member according to any of the previous items, wherein the elongated part of the retaining member is connected on the body part on a surface pointing downwards, when the retaining member is attached to the earpiece and the earpiece is inserted in its intended position in the user's ear.
16. The retaining member according to any of the previous items, wherein the elongated part of the retaining member is configured to be bended to follow the shape of the concha from below to up, when the retaining member is attached to the earpiece and the earpiece is inserted in its intended position in the user's ear.
17. The retaining member according to any of the previous items, wherein the elongated part of the retaining member is arranged on the body part opposite to the opening/slit/gap of the body part.
18. The retaining member according to any of the previous items, wherein the retaining member is made of a plastics material, such as a medical grade plastic.
19. The retaining member according to the previous item, wherein the plastics material is defined by a flexibility having a Shore A durometer value of between about 25 to 70.
20. The retaining member according to any of the preceding items, wherein the elongated part comprises segments which provide flexibility.
21. The retaining member according to any of the preceding items, wherein the elongated part is longer than the body part in every direction/dimension.
22. The retaining member according to any of the previous items, wherein the elongated part of the retaining member has a length of about 2.5 cm-4.5 cm, and wherein the body part of the retaining member has a size of about 0.2 cm-0.6 cm in each dimension/direction.
23. An earpiece configured for attachment of a retaining member, the earpiece being configured for insertion into at least a part of the ear canal of a user's ear, the earpiece comprising a protrusion, the retaining member comprising:
    a body part configured to be attached to the earpiece; and
    an elongated part configured to abut at least a part of the concha of the user's ear, when the retaining member is attached to the earpiece and the earpiece is inserted in its intended position in the user's ear, thereby providing retention of the earpiece in the ear canal;
    wherein the body part comprises an opening/slit/gap configured to be arranged on the protrusion on the earpiece.
24. The earpiece according to the preceding item, wherein the earpiece is a receiver/output transducer/loudspeaker of a hearing device, and wherein the earpiece is configured to be connected to a behind-the-ear housing of the hearing device.
25. The earpiece according to item 23 or 24, wherein a dome is configured to be attached to the earpiece in the medial end.
26. Use of a retaining member according to item 1 for an earpiece according to item 23 as a sports lock for a hearing device.

LIST OF REFERENCES

2 retaining member
4 earpiece
6 body part of retaining member
8 elongated part of retaining member
10 slit in body part
12 protrusion on the earpiece
14 wire/cable
16 surfaces/primary surfaces of body part
**16*a*** first surface/first primary surface
**16*b*** second surface/second primary surface
**16*c*** third surface/third primary surface
**16*d*** fourth surface/fourth primary surface
20 lateral end of earpiece
22 medial end of earpiece
24 behind-the-ear unit
26 dome
28 concha
29 anti-helix
30 longitudinal axis
32 first transversal axis
34 second transversal axis
40 hearing device
42 behind-the-ear unit
44 behind-the-ear housing
46 first transducer/microphone
48 signal processor
50 wireless communication unit
52 antenna
54 plug connector

56 earpiece housing
58 receiver/loudspeaker/speaker in earpiece

The invention claimed is:

1. A retaining member for an earpiece, the earpiece being configured for insertion into at least a part of an ear canal of an ear of a user, the retaining member comprising:

a body part configured to attach to the earpiece; and an elongated part configured to abut at least a part of a concha of the ear, when the retaining member is attached to the earpiece and the earpiece is inserted in its intended position in the ear of the user, thereby providing retention of the earpiece in the ear canal;

wherein the body part comprises an opening configured to cooperate with a protrusion on the earpiece, wherein the opening extends from an outer surface of the body part such that the protrusion is visible in the opening when the retaining member is attached to the earpiece.

2. The retaining member according to claim 1, wherein the opening is configured to accommodate the protrusion on the earpiece.

3. The retaining member according to claim 1, wherein the body part has a side with the opening, wherein the protrusion is on a transverse side of the earpiece, and wherein the side of the body part is configured to cover the transverse side of the earpiece while the opening at the side of the body part accommodates the protrusion on the transverse side of the earpiece.

4. The retaining member according to claim 1, wherein the body part of the retaining member is configured to attach to the earpiece along a longitudinal axis, the longitudinal axis extending from a lateral end to a medial end of the earpiece.

5. The retaining member according to claim 1, wherein the opening of the body part of the retaining member is provided along a first transversal axis, the first transversal axis being perpendicular to a longitudinal axis of the earpiece.

6. The retaining member according to claim 1, wherein the body part is configured to encase at least a part of the earpiece.

7. The retaining member according to claim 1, wherein the retaining member is configured to attach to a lateral end of the earpiece.

8. The retaining member according to claim 1, wherein the elongated part of the retaining member is at a first side of the body part, and the opening is at a second side of the body part, the second side being opposite to the first side.

9. The retaining member according to claim 1, wherein the elongated part has a total longitudinal length that is longer than a maximum dimension of the body part.

10. The retaining member according to claim 1, wherein the retaining member is a sports lock for the earpiece.

11. The retaining member according to claim 1, wherein the opening of the body part comprises a slit.

12. The retaining member according to claim 11, wherein the slit is located between wall portions of the body part.

13. The retaining member according to claim 1, wherein the opening of the body part comprises an elongated recess.

14. The earpiece of claim 1, comprising the retaining member of claim 1.

15. An earpiece configured for attachment with a retaining member, the earpiece being configured for insertion into at least a part of an ear canal of an ear of a user, the earpiece comprising a protrusion, the retaining member comprising (1) a body part configured to attach to the earpiece, and (2) an elongated part configured to abut at least a part of a concha of the ear, when the retaining member is attached to the earpiece and the earpiece is inserted in its intended position in the ear of the user, thereby providing retention of the earpiece in the ear canal, wherein the body part comprises an opening, and wherein the protrusion on the earpiece is configured to cooperate with the opening of the body part of the retaining member, wherein the opening extends from an outer surface of the body part such that the protrusion is visible in the opening when the retaining member is attached to the earpiece.

16. The earpiece according to claim 15, wherein the earpiece is configured to be connected to a behind-the-ear housing.

17. A system comprising the earpiece of claim 15 and the retaining member.

18. The system according to claim 17, wherein the protrusion of the earpiece is configured to be accommodated in the opening of the body part of the retaining member.

19. The system according to claim 17, wherein the body part has a side with the opening, wherein the protrusion is on a transverse side of the earpiece, and wherein the side of the body part is configured to cover the transverse side of the earpiece while the opening at the side of the body part accommodates the protrusion on the transverse side of the earpiece.

20. The system according to claim 17, wherein the body part is configured to encase at least a part of the earpiece.

21. The system according to claim 17, wherein the elongated part of the retaining member is at a first side of the body part, and the opening is at a second side of the body part, the second side being opposite to the first side.

22. The system according to claim 17, wherein the elongated part has a total longitudinal length that is longer than a maximum dimension of the body part.

23. The system according to claim 17, wherein the retaining member is a sports lock for the earpiece.

24. The system according to claim 17, wherein the opening of the body part comprises a slit.

25. The retaining member according to claim 1, wherein the elongated part is configured to contact a lower part of the concha of the user.

26. The retaining member according to claim 1, wherein the body part is configured to circumscribe a part of the earpiece, the part of the earpiece having a cross-sectional dimension that is less than a maximum cross-sectional dimension of the earpiece.

27. A retaining member for an earpiece, the earpiece being configured for insertion into at least a part of an ear canal of an ear of a user, the retaining member comprising:

a body part configured to attach to the earpiece; and an elongated part configured to abut at least a part of a concha of the ear, when the retaining member is attached to the earpiece and the earpiece is inserted in its intended position in the ear of the user, thereby providing retention of the earpiece in the ear canal, wherein the elongated part is configured to contact a lower part of the concha of the user;

wherein the body part comprises an opening configured to cooperate with a protrusion on the earpiece.

28. A retaining member for an earpiece, the earpiece being configured for insertion into at least a part of an ear canal of an ear of a user, the retaining member comprising:

a body part configured to attach to the earpiece; and an elongated part configured to abut at least a part of a concha of the ear, when the retaining member is attached to the earpiece and the earpiece is inserted in its intended position in the ear of the user, thereby providing retention of the earpiece in the ear canal;

wherein the body part comprises an opening configured to cooperate with a protrusion on the earpiece; and wherein the body part is configured to circumscribe a part of the earpiece, the part of the earpiece having a cross-sectional dimension that is less than a maximum dimension of the earpiece.

29. An earpiece configured for attachment with a retaining member, the earpiece being configured for insertion into at least a part of an ear canal of an ear of a user, the earpiece comprising a protrusion, the retaining member comprising (1) a body part configured to attach to the earpiece, and (2) an elongated part, wherein the body part comprises an opening, wherein the protrusion on the earpiece is configured to cooperate with the opening of the body part of the retaining member, and wherein the protrusion of the earpiece is at a part of the earpiece, the part of the earpiece having a cross-sectional dimension that is less than a maximum cross-sectional dimension of the earpiece.

* * * * *